July 10, 1923.
W. H. FRIEDLINE
CABINET CONSTRUCTION
Filed Nov. 21, 1919
1,461,239
11 Sheets-Sheet 4
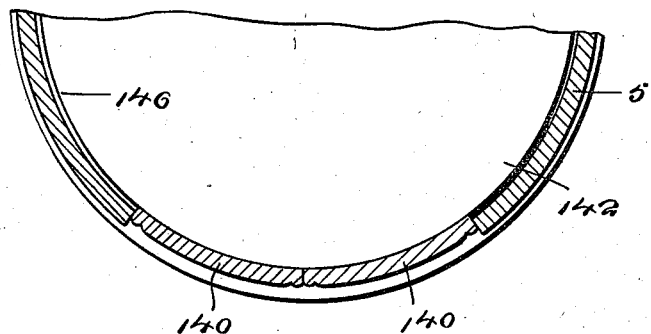
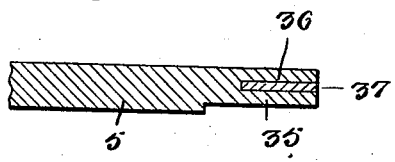
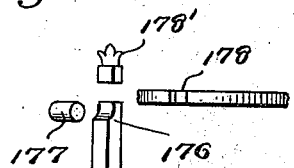
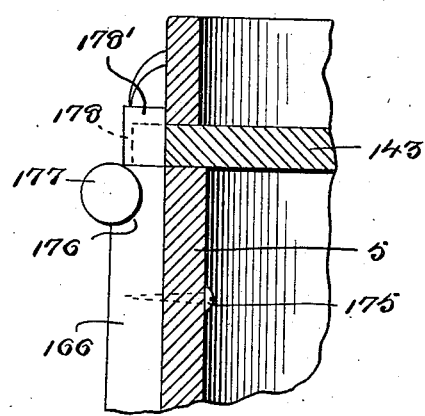
Inventor
W. H. Friedline
By Victor J. Evans
Attorney
Witnesses

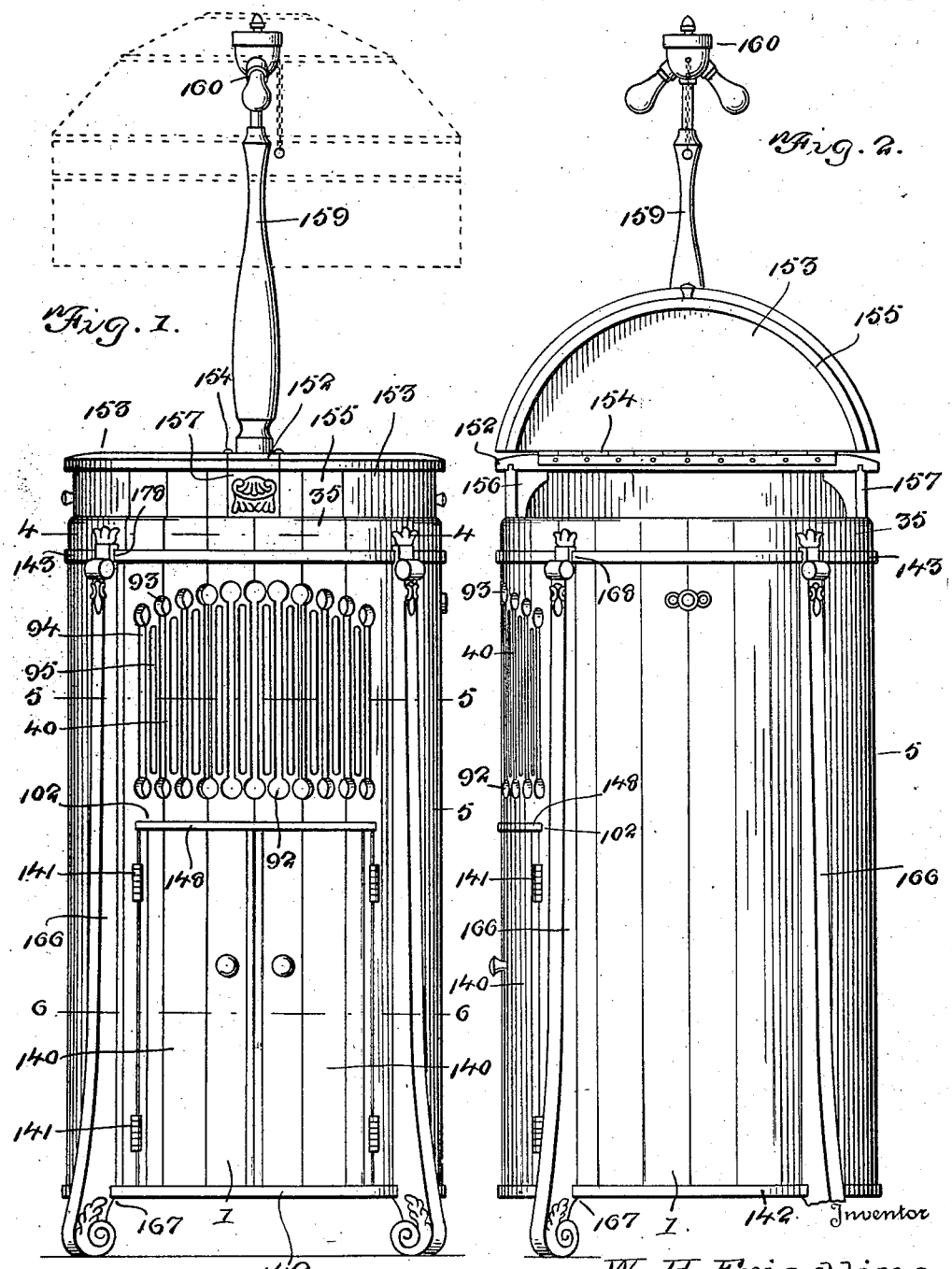

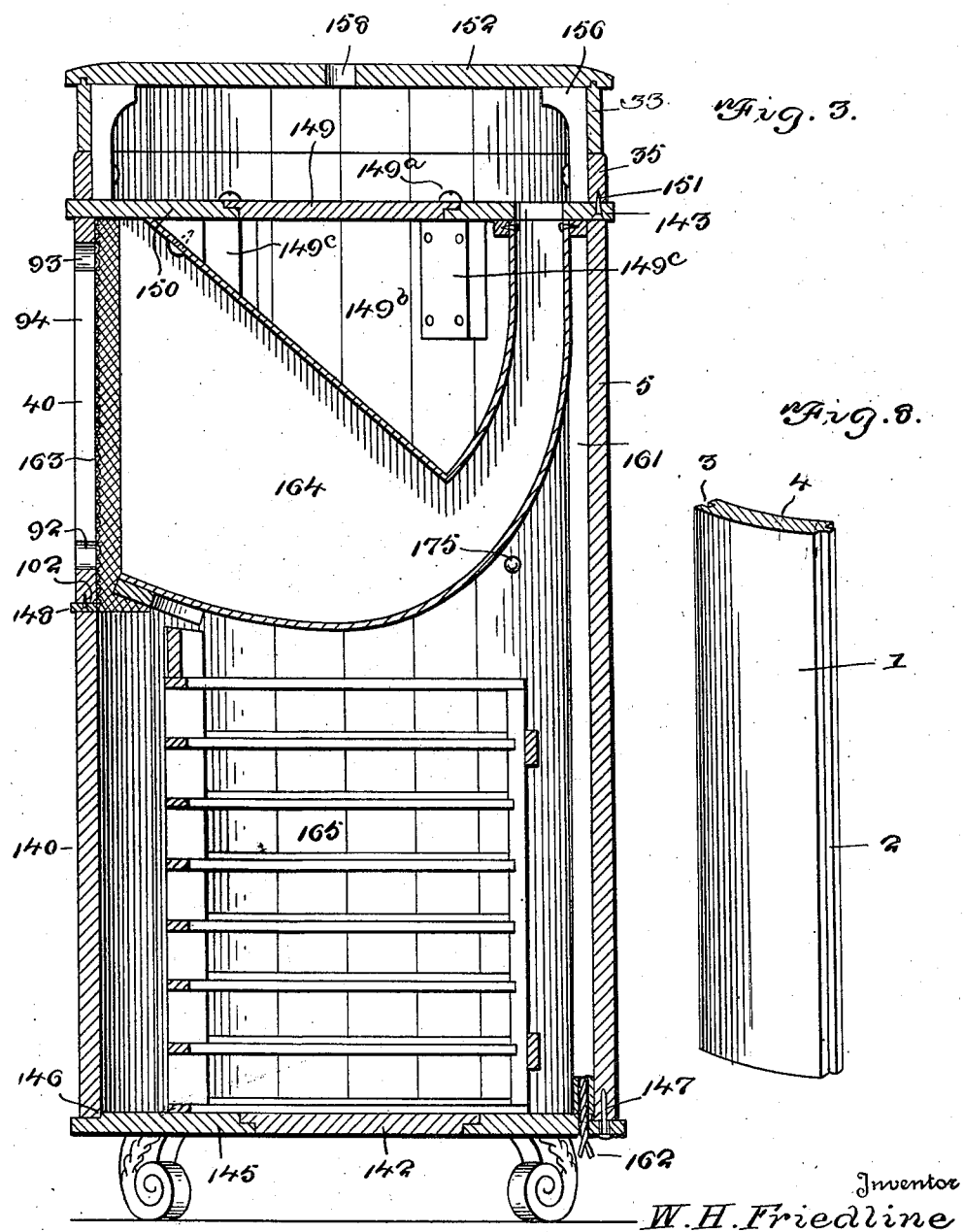

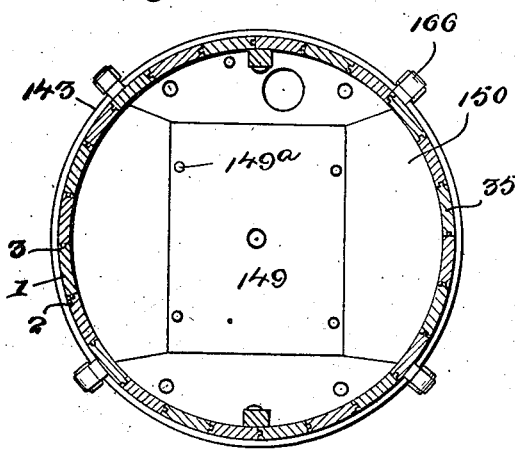
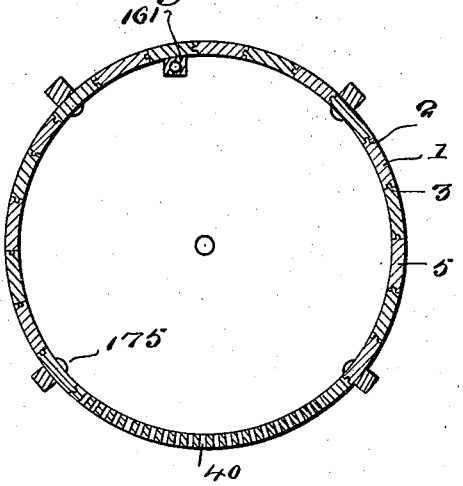
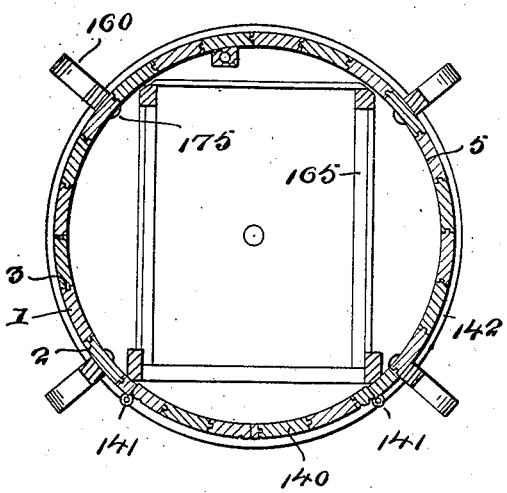
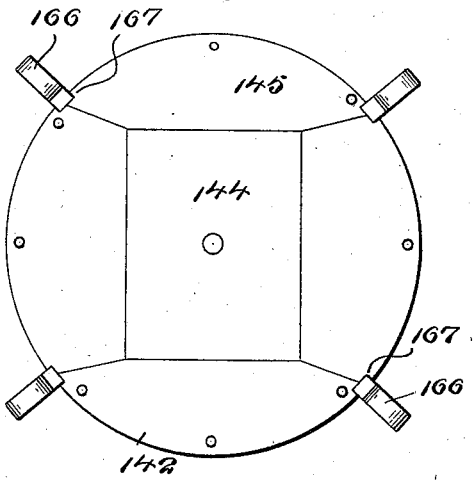

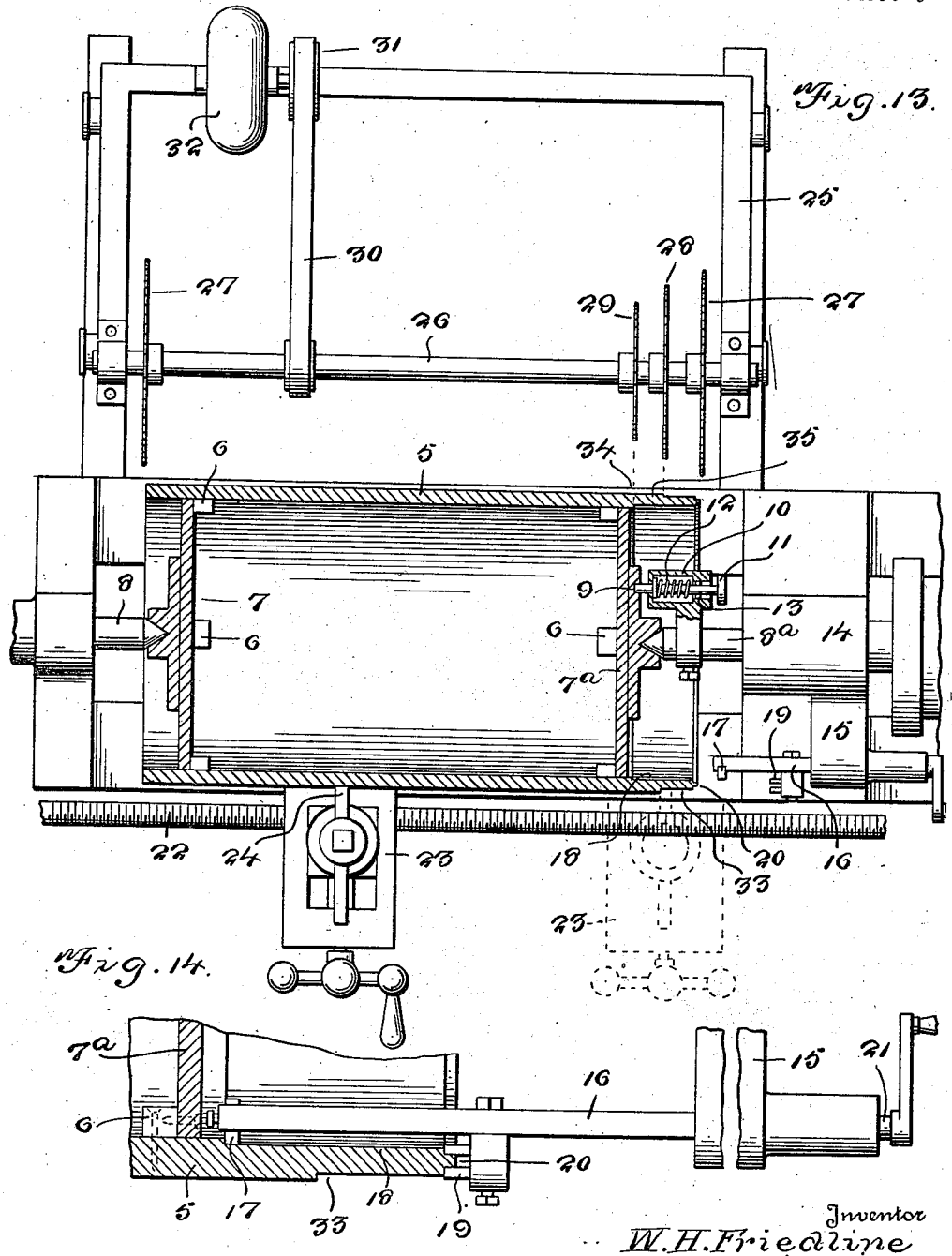

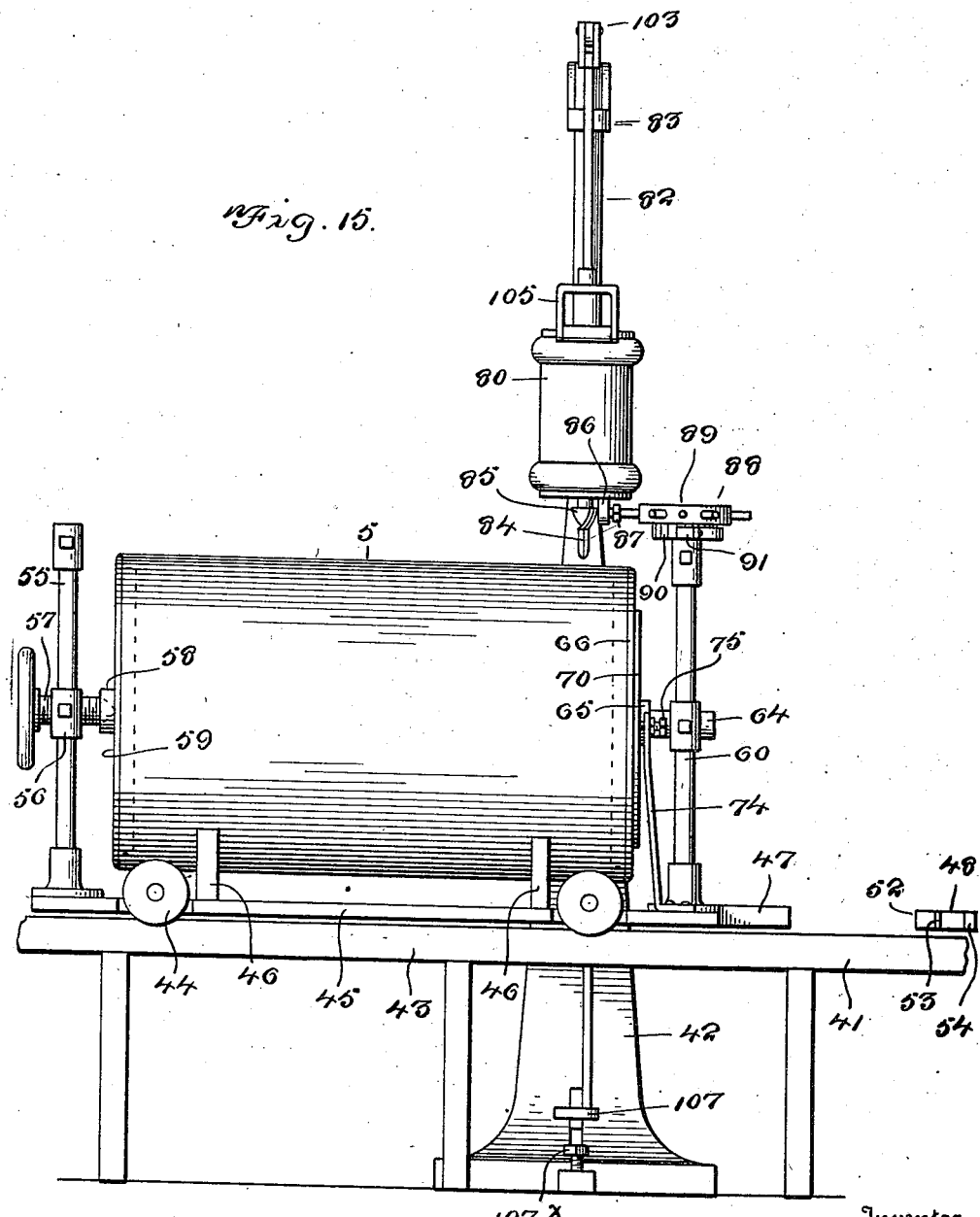

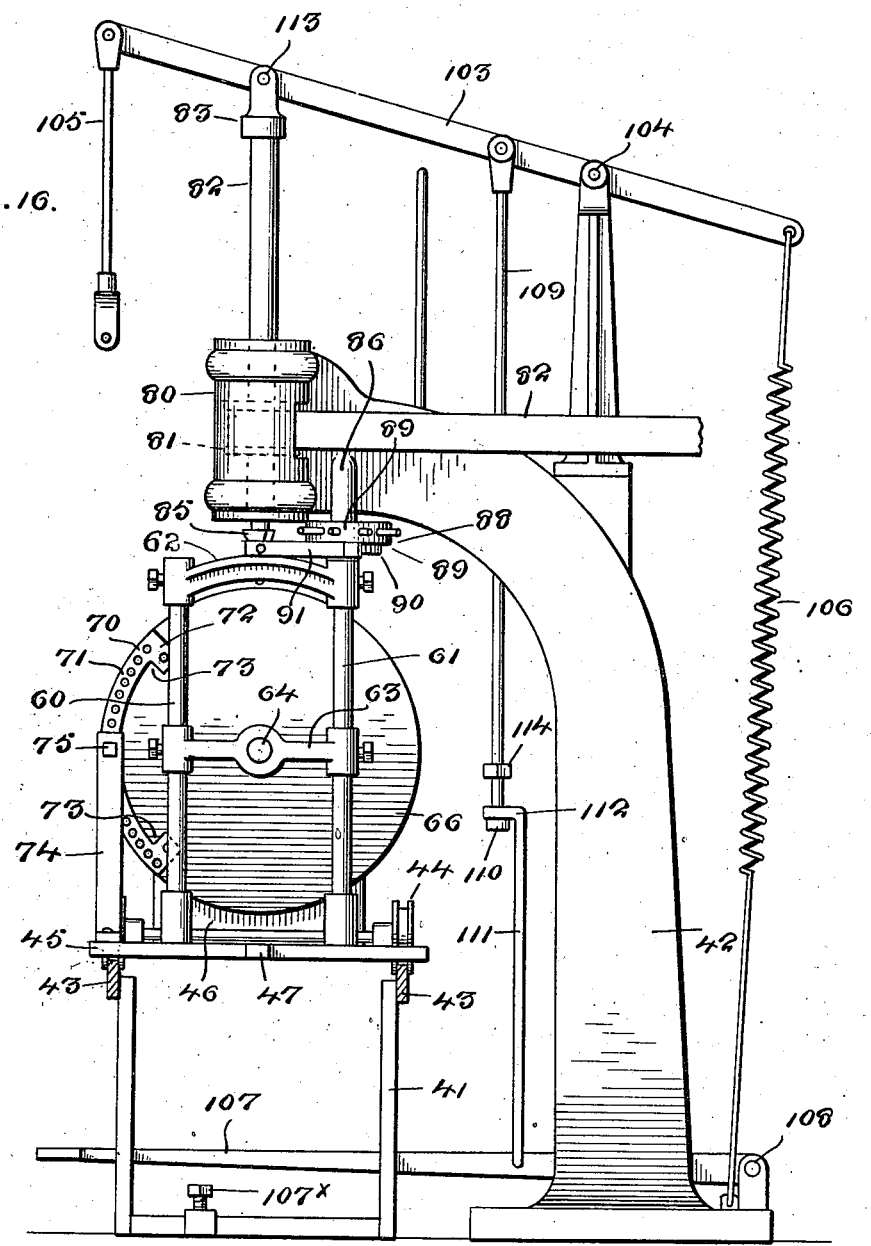

July 10, 1923.

W. H. FRIEDLINE

CABINET CONSTRUCTION

Filed Nov. 21, 1919

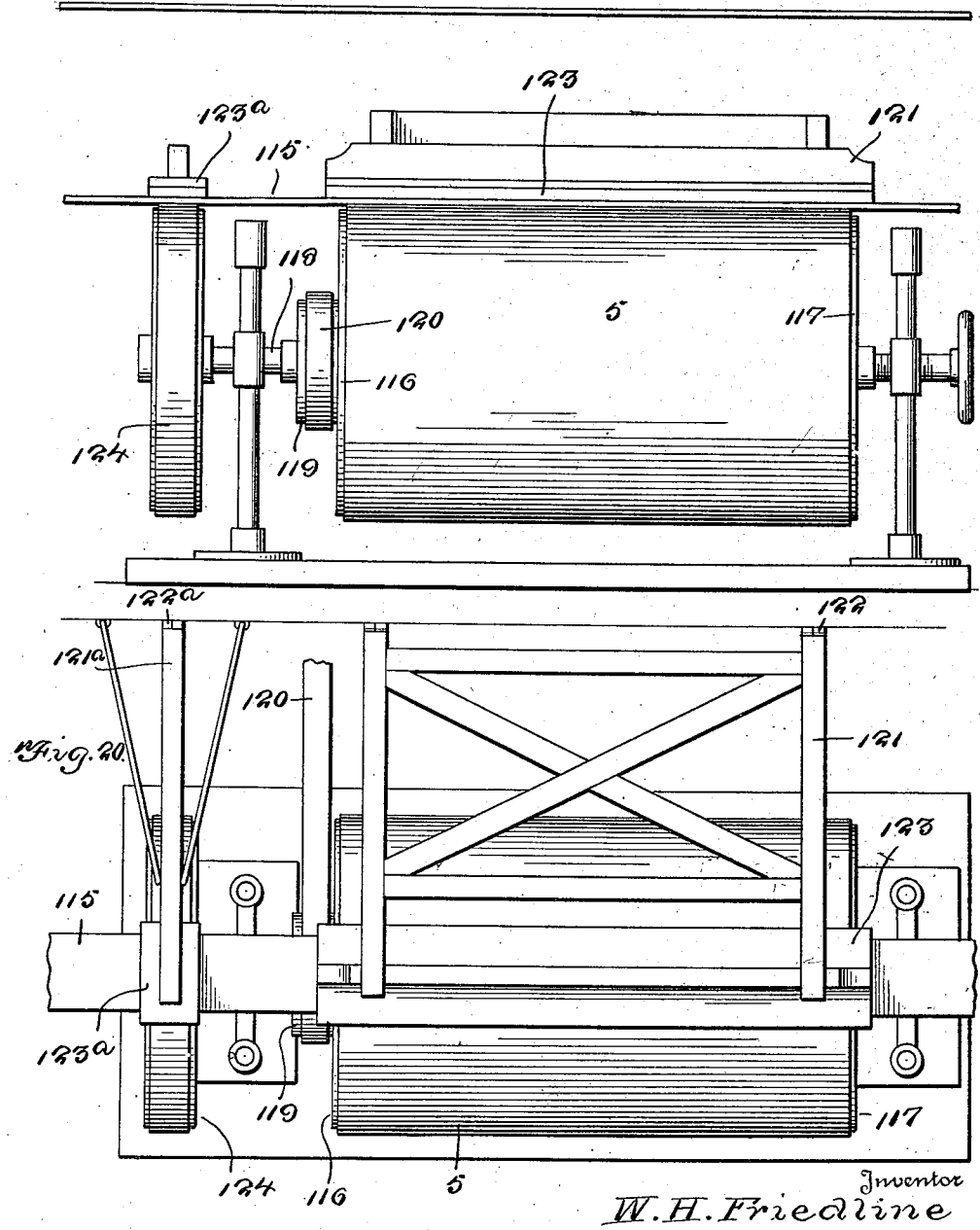

July 10, 1923.
W. H. FRIEDLINE
CABINET CONSTRUCTION
Filed Nov. 21, 1919
1,461,239
11 Sheets-Sheet 10
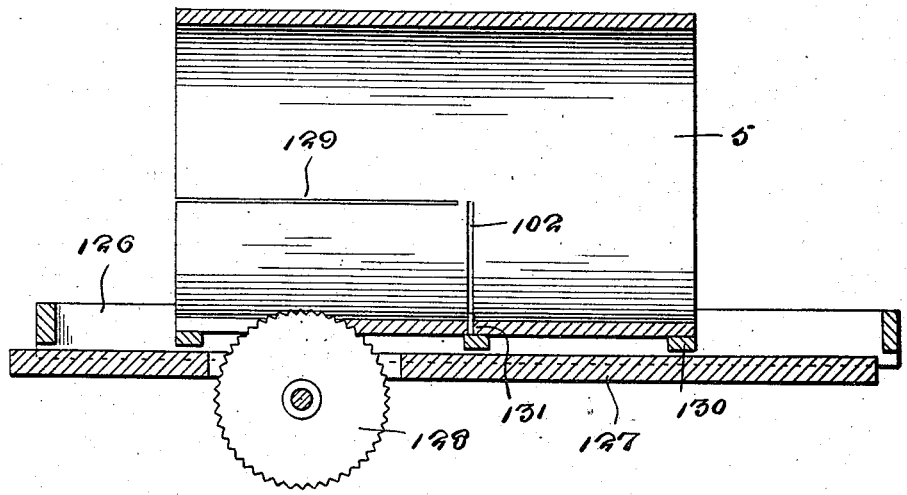
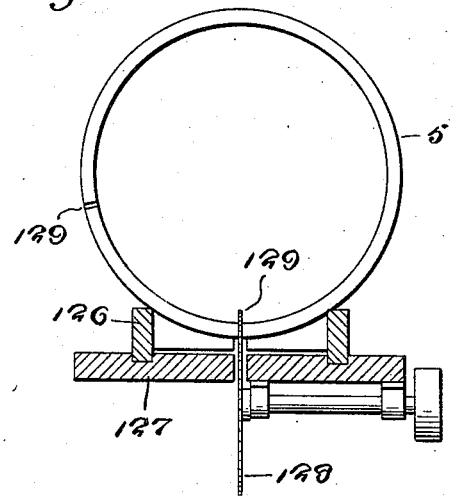
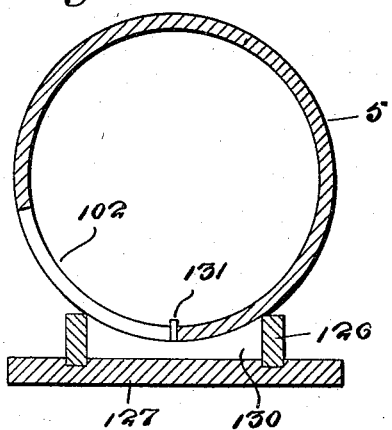
Inventor
W. H. Friedline
Witnesses
By Victor J. Evans
Attorney July 10, 1923.
W. H. FRIEDLINE
CABINET CONSTRUCTION
Filed Nov. 21, 1919 11 Sheets-Sheet 11
1,461,239
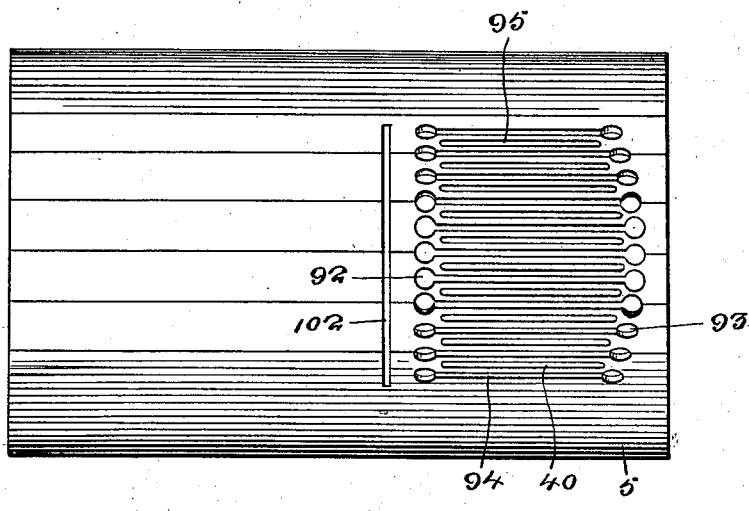
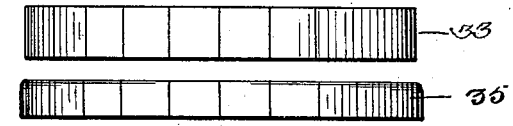
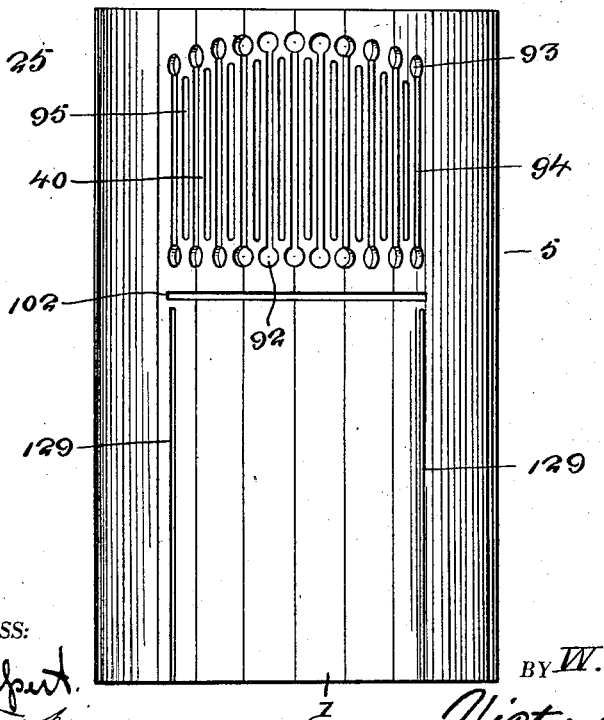
WITNESS:
INVENTOR.
BY W. H. Friedline
ATTORNEY.

Patented July 10, 1923.

1,461,239

UNITED STATES PATENT OFFICE.

WILLIAM H. FRIEDLINE, OF MEYERSDALE, PENNSYLVANIA, ASSIGNOR TO MODERNOLA COMPANY, OF JOHNSTOWN, PENNSYLVANIA, A CORPORATION OF PENNSYLVANIA.

CABINET CONSTRUCTION.

Application filed November 21, 1919. Serial No. 339,708.

*To all whom it may concern:*

Be it known that I, WILLIAM H. FRIEDLINE, a citizen of the United States, residing at Meyersdale, in the county of Somerset and State of Pennsylvania, have invented new and useful Improvements in Cabinet Constructions, of which the following is a specification.

Certain objects of my present sole invention are the provision of an expeditious, economical, efficient and otherwise practically advantageous process of constructing wooden cabinets designed more especially, though not necessarily, for use as phonograph cabinets, and the provision, particularly, though not necessarily, as a product of the process, of a novel, useful and highly desirable cabinet that is durable and otherwise well adapted to meet general conditions and is at the same time highly ornamental.

Another object of the invention is the provision of novel and highly useful organized mechanisms especially adapted for carrying out my process though not restricted in their use to the same.

To the attainment of the foregoing, the invention consists in the novel and useful process, the novel and useful cabinet, and in the organized mechanisms, as hereinafter described and definitely claimed.

In the accompanying drawings, hereby made a part hereof:

Figure 1 is a front elevation of a phonograph cabinet constructed in accordance with my invention, showing the doors and lids as closed.

Figure 2 is a side elevation of same with the lids in fully raised position.

Figure 3 is an enlarged vertical section of the cabinet body.

Figures 4, 5 and 6 are horizontal, transverse sections taken in the planes indicated by the lines 4—4, 5—5 and 6—6, respectively, of Figure 1.

Figure 7 is an inverted plan view of the cabinet.

Figure 8 is an enlarged perspective of a portion of one of the staves that enter into the body of the cabinet, Figures 9, 10, 11 and 12 are views illustrative of details of construction hereinafter explicitly referred to.

Figures 13 and 14 are views of the organized mechanisms for use in the practice of the process on the cylindrical body formed of assembled and connected staves.

Figures 15 and 16 are elevations at right angles to each other of an organized mechanism for operating on the cylindrical body after the same is reduced to the proper length for incorporation in a cabinet body.

Figure 17:
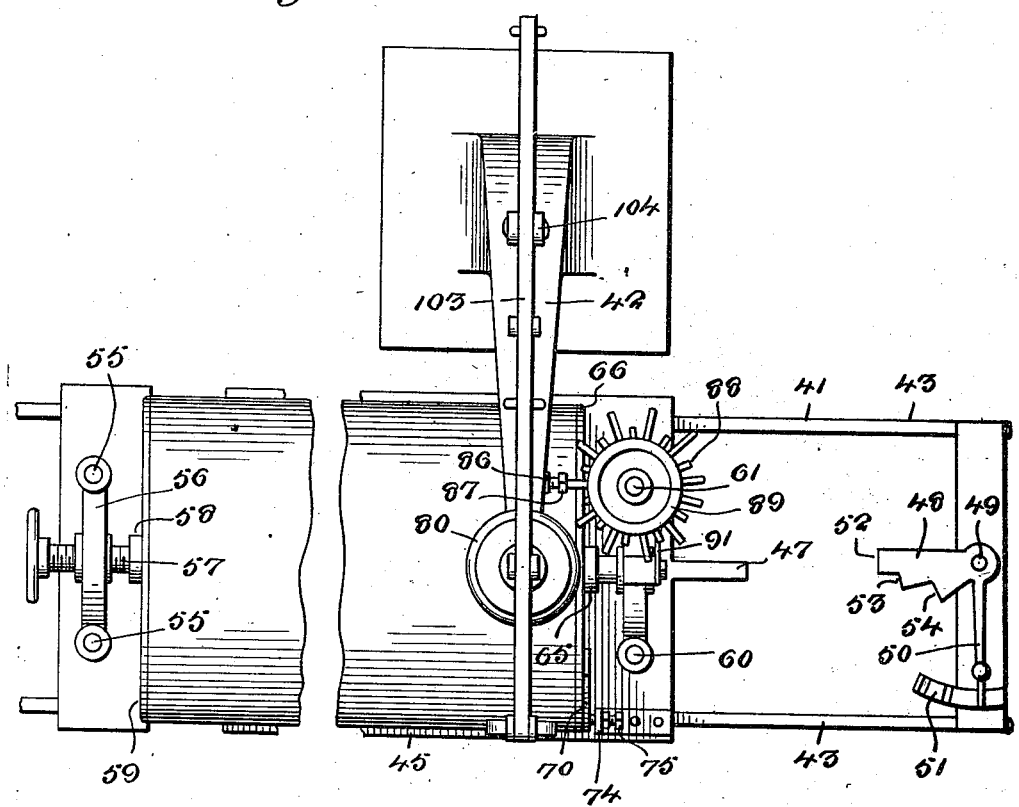

Figure 17 is a broken plan of said mechanism.

Figure 18:
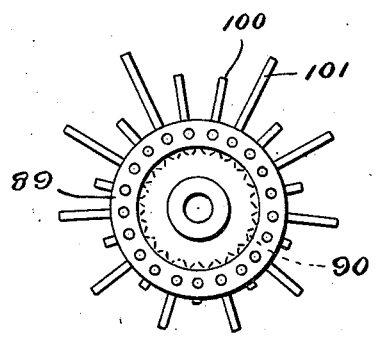

Figure 18 is an enlarged detail of a portion of the same.

Figure 19 is a side elevation, and Figure 20, a plan of another organized mechanism that enters into the practice of the process.

Figures 21, 22 and 23 are views of still another organized mechanism that enters into the practice of the process.

Figure 24 is a view of the casing body as it appears after the operations in the portion of organized mechanism shown in Figures 15-17.

Figure 25 is a view showing the casing body and the two annular cut-off portions as they appear after the operations in the portion of organized mechanism shown in Figures 19 and 20, and the portion of mechanism shown in Figures 21-23.

Similar numerals of reference designate corresponding parts in all of the views of the drawings.

For convenience in description, and brevity consistent with clearness, the construction of the cabinet and the practical advantages thereof will be disclosed concurrently with a full and exact understanding of the mode of fabricating or producing the cabinet, and the organized mechanisms employed in such production.

In the practice of my invention, I first provide staves 1, of which one is shown in Figure 8. The said staves are respectively characterized by a tongue 2 on one edge, a groove 3 in the other edge, and a side 4 concave in cross-section and of a contour corresponding to the interior diameter of the cabinet body 5.

In furtherance of my process, sufficient of the staves 1 to form the body 5 are supplied with glue on their edges, and are arranged and secured, edge to edge, in cylindrical formation. When so fabricated into a cylinder, the said staves are somewhat longer than the cabinet body 5. The cylinder referred to is first provided in its interior with temporarily secured blocks 6, Figures 13 and 14, and heads 7 and 7ª are then arranged in the cylinder and against said blocks 6, as appears in Figure 13. The cylinder with the heads referred to therein are arranged between centers 8 and 8ª of the mechanism shown in Figure 13; the said centers being socketed in the outer sides of the heads. It will also be noticed that the head 7ª is provided with a supplemental socket 9 off the center thereof, and that the spindle center 8ª is provided with a lateral arm 10 in which is housed a pin 11 for co-operation with the said supplemental socket 9; the said pin 11 being pressed inwardly by a spring 12, and being provided with a lug 13, so that when the pin is retracted against the action of the spring 12, and is turned about its axis, the lug 13 will bear against the outer end of the housing 10 and thereby detachably secure the pin out of working position. From this it will be understood that when the pin 11 is seated in the supplemental socket 9, the heads 7 and 7ª and the cylinder will be turned with the spindle 8ª that is designed to be driven by a suitable motor, not illustrated. When, however, the pin 11 is retracted and secured in its retracted position as stated, the cylinder and the heads therein may be freely turned by hand upon the opposed centers 8 and 8ª. Carried by the standard 14 in which the spindle center 8ª is journaled, is a lateral arm 15, and movable rectilinearly by a feed screw 21 in the said arm 15 and in the direction of the length of the mounted cylinder is a bar-like body 16 that carries a cutter 17 to enlarge the interior of the cylinder at 18, and also carries spaced and parallel cutters 19, designed to provide the cylinder at its end with the tongue 20. The bar-like body 16 is of course held against turning about its axis in the arm 15. Mounted to be moved longitudinally by the rotation of a feed-screw 22 is a carriage 23 on which is a cutter or planer 24 that is opposed to the outer side of the cylinder and has for one of its functions to smooth or plane the said outer side. At 25 is a carriage that is movable by hand toward and from the cylinder, and is equipped with a shaft 26 on which are saws 27 together with a saw 28 and a saw 29. The shaft 26 is driven through a belt 30 from a pulley 31 that derives its motion from an electric motor 32 on the carriage 25. In the operation of this portion of organized mechanism, the cylinder is rotated about its axis by a power means, and incidental to such rotation, the planer 24 is opposed to the outer side of the cylinder and is gradually fed throughout the length thereof. Thus the outer side of the cylinder is smoothed. Then the cutter 24 is positioned and the cylinder is rotated about its axis to bring about a reduction in thickness of the cylinder portion 33, Figure 13. Then the bar-like body 16 is advanced or moved inwardly to enable the cutter 17 to enlarge the interior of the cylinder at 18, and to enable the cutters 19 to form the tongue 20. The bar-like body 16 is then retracted to the position shown in Figure 13, and the pin 11 is also retracted and detachably secured in retracted position to render the cylinder loose, so that the same may be conveniently turned about its axis by hand. At this point the carriage 25 is moved inwardly by hand, and at the same time the cylinder is manually turned about its axis, whereupon the saws 27 will operate to cut off the superfluous end portions of the cylinder. Then by further inward movement of the carriage 25, the saw 28 will operate to cut the portion 33 from the remainder of the cylinder, the cylinder being rotated by hand at this time. Then during the continued rotation of the cylinder by hand, the carriage 25 is manually moved still further inward, with the result that the saw 29 will cut the cylinder at the point 34, and thereby form an annular portion, indicated by 35 in Figure 13, and hereinafter explicitly alluded to, inasmuch as it forms the motor board rim 35 of the cabinet body, Figures 1 to 3. After the cutting of the portion 35 from the cylinder through the medium of the saw 28, and during the rotation of the cylinder, a hand tool (not shown) is employed to provide in the edge of the portion 35 a deep and narrow groove 36, Figure 11, and in the said groove is inserted and glued a piece of veneer lumber 37 which lends great increased strength to the portion 35 when the same is put into use with a motor board rim. I would also have it understood at this point, that after the annular portion 35 is cut at the point 34 from the remainder of the cylinder, a groove similar to the groove 36 may be formed in the end of the said remainder, and pieces of veneer lumber similar to the piece 37 may be inserted and glued therein to strengthen the upper end of the cabinet body 5. The piece of veneer lumber 36 and the other piece of veneer lumber alluded to may be placed and secured as described while the cylinder is in the apparatus shown in Figures 13 and 14, or after the cylinder is removed from the said apparatus or organized mechanism, in the discretion of those practicing the process. After the making of the saw cut at the point 34, there is left in the mechanism portion shown in Figure 3 only the cabinet body 5; and at the proper time the said body 5 is removed from said mechanism portion, preferably, though not necessarily, through the medium of a block and tackle on an overhead track. This block and tackle and overhead track I have deemed it unnecessary to illustrate.

The cylinder having been removed from the apparatus or portion of organized mechanism shown in Figure 13, the process is continued as follows: viz:—the cabinet body 5 is mounted in the portion of organized mechanism illustrated in Figures 15 to 18, to which reference will now be had. In the said portion of the organized mechanism, Figures 15 to 18, the body 5 is provided with the open-work characteristic designated generally as 40, in Figures 1 and 2. The said portion of organized mechanism, Figures 15 to 18, includes among other elements a base frame 41, and a standard 42 that overhangs the base frame. The base frame 41 is provided with longitudinal rails 43 and bearing on said rails are the circumferentially grooved wheels 44 of a longitudinally movable carriage 45 on which are rests 46 on which the cabinet body 5 is first deposited. At one end the carriage 45 is provided with a longitudinal projection 47, designed to cooperate with a stop 48, pivoted at 49 on the frame 41, and having a lever 50. Through the said lever 50 the stop 48 may be adjusted, and by the cooperation of the said lever with a segmental rack 51, the stop may be adjustably fixed in position. As best shown in Figure 17, the stop 48 is characterized by an end portion 52 and two steps 53 and 54, respectively. Adjacent to one end, the carriage 45 is provided with two uprights 55, and interposed between the said uprights 55 is a cross-bar 56 through which is threaded a screw 57, the inner end of which is cone-shaped, Figure 15, and is disposed in a correspondingly shaped socket 58 in one head 59. Adjacent to its opposite end the carriage 45 is provided with two uprights 60 and 61 which are connected by a crown-bar as shown and are also connected by an intermediate bar 63 in which latter is mounted a centering pin 64 the inner end of which is disposed in a socket 65 in a head 66. In the arrangement of the cabinet body 5 in the mechanism of Figures 15 to 17, the said body 5 is first interposed between the heads 59 and 66, and placed in and on the rests 46. The screw 57 is then turned inwardly, and this has the duplex effect of clamping the body 5 endwise between the heads 59 and 66 and restoring the said body 5 clear of the rests 46, the latter result being due to the cooperation of a cone-shaped inner end of the screw 57 and the similar shape of the socket 58. After the said operation, it will be understood that the cabinet body 5 is free to be turned by hand about its axis. Fixed to the outer side of the head 66, so as to turn therewith, is an arcuate plate 70, in which is an arcuate series of apertures 71 corresponding in number to the longitudinal openings comprised in the characteristic 40, Figure 1. It will also be observed theat the arcuate plate 70 is provided at its ends with inwardly reaching arms 72, the opposed edges 73 of which are designed to serve a purpose as presently set forth. Connected to the carriage 45 is a spring arm 74 by which is carried a pin 75, designed to enter and cooperate with the apertures 71 and also adapted to cooperate with the edges 73 of the plate arms 72. Carried by the overhanging standard 42 and disposed above the vertical center of the organized mechanism is a casing 80 in which is arranged a horizontal pulley 81 around which is arranged a belt 82, adapted to be connected with a motor (not shown). Arranged to move endwise vertically through and always turn with the said pulley 81, is a spindle 82 on the upper end of which is swiveled a cap 83. At its lower end the said spindle 82 is provided with a combined boring and routing tool 84, and immediately above the tool, 84, the spindle is equipped with a comparatively large boring tool 85. The tool 84 is to form the slots of the open-work characteristic 40, and the tool 85 is to form the circular openings at the ends of the alternate slots. Depending from the casing 80, off the center thereof, is a lug 86, and carried in the said lug 86 is an adjustable abutment 87 in the form of a bolt, the shank of which is threaded in the said lug. The abutment 87 is for cooperation with the adjustable stop, generally indicated by 88. By comparison of Figures 15 to 18, it will be noted that one of the uprights 61 is extended above the crown-bar 62, and on the said upright 61 is loosely mounted a horizontal wheel 89 to the under side of which is fixed a ratchet disk 90, with which cooperates a detent 91, the function of which is to yieldingly retain the wheel 89 in the position in which the same is placed. Now by comparison of Figures 1 and 18, it will be noted that the wheel 89 is provided with a plurality of radial projections on its periphery; the said projections corresponding in number to the slots in the open-work characteristic 40 of Figure 1, and the apertures 71 in the arcuate plate 70. It will also be observed by reference to Figure 1 that all of the lower openings 92 of the open-work characteristic 40 are arranged in the same horizontal plane; that the upper openings 93 are arranged in the arc of a circle; that slots 94 extend vertically between the openings 92 and 93; that the lower ends of the slots 95 between the slots 94 are arranged in a common horizontal plane; and that the upper ends of the slots 95 are arranged to describe a part of a circle of less radius than the circle described by the plurality of upper openings 93. It being remembered that the openings 92 and 93 are formed by the comparatively large tool 85, and that all of the slots in the openwork characteristic 40 are formed by the combined boring and routing tool 84, it will be understood that when the constantly rotating spindle 82 is moved downwardly by means hereinafter described, the tool 84 will pass through the wall of the body 5 and immediately thereafter the tool 85 will form one of the circular openings 93. Then when the tools 84, 85 are raised so that the tool 84 alone remains in the wall of the body 5, and the said body 5 is moved endwise toward the right, the tool 84 will form the slot 94 complementary to the said opening 93. Then when the tools are depressed so as to enable the large tool 85 to operate on the wall of the body 5, the lower aperture 92 in vertical alignment with the upper aperture 93 referred to, will be formed. The arrangement of all of the lower apertures 92 in the same horizontal plane is brought about by the projection 47 on the carriage 45 in cooperation with the end 52 of the adjustable stop 48, and the arrangement of the lower ends of the slots 95 in the common horizontal plane is brought about by the cooperation of the said projection 47 with the step 53 of the stop 48. It is well to note here that the remaining step 54 of the stop 48 is for a purpose hereinafter set forth. The slots 95, like the slots 94, are formed by the tool 84 alone in the wall of the body 5, incidental to the endwise movement of the said body 5 toward the right from the position shown in Figure 15, it being remembered here that the adjustable stop 88 is carried by the carriage 45 that moves as a unit with the body 5. There are two groups of radial projections on the wheel 89, and the projections 100 of one group are generally shorter than the projections 101 of the other group. It will be noticed, however, that the projections 100 of the generally short group are varied in length, and that the projections 101 of the generally long group are likewise varied in length. The projections 100 are for use in combination with the abutment 87 for the formation of the openings 92 and 93 and the slots 94 between said openings, and the projections 101, are for use in combination with the said abutment 87 in the formation of the slots 95. Inasmuch as the particular stop or wheel 89 that is opposed to the abutment 87 limits the endwise traverse of the body 5 toward the right in Figure 15, it will be manifest that the graduated stops 100 and 101 will fix the positions of the upper openings 93, and the positions of the upper ends of the slots 95. The formation of all of the openings 93 and 92, the slots 94 between said openings, and the slots 95, will be understood from the following: In commencing the formation of the openwork characteristic 40, the pin 75 is placed in the uppermost aperture 71 of the arcuate plate 70 the body 5 with the head 66 having first been turned about its axis to position the uppermost aperture 71 for the reception of the pin 75. Then with the abutment 87 against one of the projections 100 of the pair at the top of Figure 18, the spindle 82 is depressed so that the tool 84 will pass through the wall of the body 5 and will be followed by the tool 85, which tools will form the upper left hand opening 93 in Figure 1. The spindle 82 is then raised to a slight extent, so that the tool 84 alone remains in the wall of the body 5, and the body 5 is then moved endwise with the carriage toward the right until the projection 47 brings up against the step 53 of the stop 48.

Incidental to said endwise movement of the body 5 toward the right, the tool 84 will form the slot 94 at the left of Figure 1. When the projection 47 brings up against the step 53 of the stop 48, the spindle 82 is depressed to a slight extent, whereupon the tool 85 will form the lower opening 92 at the left of Figure 1. The wheel 89 is then turned about its axis to oppose one of the longest of the projections 101 to the abutment 87, the pin 75 is removed from the uppermost aperture 71 in the plate 70, and then after a slight turn of the body 5 about its axis, is placed in the second aperture 71 from the top, and the stop 48 is adjusted to oppose end 52 thereof to and in alignment with the projection 47 on the carriage. The arrangement of the projection 101 referred to against the abutment 87 will determine the location of the upper end of the slot 95 at the left of Figure 1, and then when the spindle 82 is slightly depressed to cause the tool 84 to penetrate the wall of the body 5, and the said body 5 is moved endwise toward the right in Figure 15, the slot 95 at the left of Figure 1 will be formed by the tool 84, the lower end of the said slot 95 being determined by the bringing up of the projection 47 against the end 52 of the stop 48. By repeating this operation of all the slots 94 and 95, the openings 93 and 92 may be expeditiously and efficiently formed, with the result that the openwork characteristic will be provided in the wall of the body 5. After all of the said slots and openings have been formed in the wall of the body 5, the pin 75 is positioned so as to enable the same to limit the turning of the body 5 about its axis to a distance corresponding to the distance between the opposed edges 73 of the arms 72 on the arcuate plate 70. The stop 48 is also adjusted so as to oppose its step 54 to the projection 47. Then when the body 5 is moved toward the right in Figure 15 until the projection 47 brings up against the step 54, and the spindle 82 is depressed to cause the tool 84 to penetrate the wall of the body 5, while the pin 75 is against one of the edges 73 of plate 70, Figure 16, and the body 5 is turned about its axis by hand until the pin 75 brings up against the other edge 73, the tool 84 will make the cut 102 in the body below and in spaced relation to the openwork characteristic 40; the said cut 102 being the upper cut for the door opening and for the production of the doors hereinafter described. For the manual manipulation of the spindle 82 and the tools 84 and 85, I provide the means best shown in Figure 16 and including a vertically swinging lever 103, fulcrumed at 104 and having a pendent handle 105 at its forward end, a retractile spring 106 interposed between the rear arm of the said lever and the machine base, a pedal lever 107, fulcrumed at 108, a pendent rod 109 on the forward arm of the lever 103 and having an abutment 110 at its lower end, and a rod 111 connected to the pedal lever 107 and having an angular and apertured arm 112 that loosely receives the rod 109 above the abutment 110 thereof. Downward movement of the pedal lever 107 is limited by a stop 107ˣ, which is preferably in the form of an adjustable bolt, as shown. The forward arm of the lever 103 is connected at 113 to the cap 83 before described as swiveled on the spindle 82. In the before described operation, the operator first depresses the pedal lever 107 to carry the tool 84 through the wall of the body 5, and then when it is desired to use the comparatively large tool 85, the operator pulls downwardly on the pendent handle 105 until the stop 114 on rod 109 brings up against the arm 112 on the rod 111. Then after use of the tool 105, and when it is desired to use the tool 84 for the formation of one of the slots, the handle 105 is released, whereupon by the action of the spring 106, the spindle 82 will be raised until the abutment 110 on the rod 109 brings up against the arm 112, when the tool 84 will be retained by the continued retention of the pedal lever 107 in its depressed position in the wall of the body 5.

After the operation described in the foregoing, the body 5 is released from between the heads of the apparatus shown in Figures 15 to 17, and the body 5, as it appears in Figure 24 is removed from the said apparatus in Figures 15 to 17, preferably with the assistance of a block and tackle on an overhead track, and the said body 5 is placed in the portion of organized mechanism shown in Figures 19 and 20. This portion of organized mechanism includes an endless abrasive belt 115, means below the lower stretch of said belt to utilize power for the turning of the body 5 about its axis and means above the lower stretch of the belt for subjecting the said belt to downward pressure while it traverses the body 5 from one end to the other thereof. The first-named means includes heads 116 and 117, the head 117 being adjustable for the clamping of the body 5 between the two heads. The other head 116 is carried by a rotary spindle 118 on which is a pulley 119 designed to receive a belt 120 connected with a motor (not shown). The pressure-exerting means includes a body 121 that is hinged at 122 to an upright wall or other support, and is provided with a shoe 123 adapted to press downwardly on the lower stretch of the belt 115, so as to crowd said stretch against the outer side of the body 5. The body 121 is of course made sufficiently heavy to afford the requisite pressure, and it will be manifest that with the belt 115 driven at a high rate of speed, and the body 5 rapidly rotated about its axis, the outer side of the body 5 will be expeditiously and thoroughly sand-papered and smoothed. The spindle 118 is provided at 124 with a wheel on which are adapted to be mounted in succession the annular portions 35 and 33, previously cut off the original cylinder; said portions 35 and 33 appearing in Figure 25. I also provide above the lower stretch of the belt 115 a supplemental body 121ᵃ, hinged at 122ᵃ and equipped above the vertical center of the wheel 124 with a shoe 123ᵃ, the function of which is to crowd the portion of belt stretch below it against the particular annular portion 35 or 33 that is mounted upon the wheel 124.

After the sand-papering or smoothing operations described, the body 5 is removed from the portion of organized mechanism shown in Figures 19 and 20 and is transferred to the portion of organized mechanism shown in Figures 21 to 23. Here the body 5 is superimposed upon a carriage 126 slidable on a table 127 and with respect to a driven saw 128, the function of which is to make the longitudinal cuts 129 for the door opening and doors; the said cuts 129 extending to the lower end of the body 5, as appears in Figure 25. The carriage 126 is provided with transverse rests 130, and one rest 130 is provided with an upstanding pin 131 which, when the body 5 is superimposed upon the rests, extends into the cut 102 of the body, as illustrated. Said pin 131 is disposed in longitudinal alignment with the saw 128, and hence when the body 5 is positioned on the rests with one end wall of the cut 102 bearing against the pin 131, and the carriage is moved toward the left in Figure 21, the saw 128 will make one of the cuts 129 in the body, and when the operation is repeated with the other end wall of the cut 102 against the pin 131, the saw 128 will make the other cut 129 in the body. The said cuts 129 are not extended to the cut 102, see Figure 21, this in order to avert injuring the pin 131 by the saw 128. On the other hand the short inner end portions of the cuts 129 are made by hand so as to join said cuts 129 with the ends of the cut 102.

After the operations on the body 5 in the mechanism shown in Figures 21, 22 and 23, the body 5, the annular member 35 and the annular member 33 are adapted to be worked into the cabinet shown in Figures 1, 2 and 3.

By the cuts 102 and 129, a door portion is removed from the body 5, and this door portion is subsequently divided by a longitudinal central cut into doors 140. After being smoothed at their inner sides and beaded or otherwise ornamented, the doors 140 are relatively arranged as shown in Figures 1, 2, 3 and 9, and are connected by hinges 141 to the body 5. It will be understood here that the doors 140 are set in from the outer surface of the body 5, Figure 9, and one advantage of this arrangement is that no refitting is necessary since the doors are connected through the medium of hinges 141.

In addition to the body 5, the cabinet comprises a bottom wall 142 of greater diameter than the body 5, a motor board 143, also of greater diameter than the body 5, and the motor board rim 35 superimposed upon the motor board 143. As shown in Figures 3 an 7, the bottom wall 142 of the cabinet is preferably composed of a central section 144, and surrounding sections 145 in each of which the grain of the wood extends lengthwise of the section. The section 144 is seated in and glued to the sections 145, and the bottom wall 142 is provided at its upper side with an offset 146 which is separated by an intervening space from the wall of the body 5, and has its forward portion adapted to form an abutment or stop for the lower end of the doors 140. The said bottom wall 142 is opposed to the lower end of the body 5, and is connected thereto by cement-covered nails 147. Arranged and secured in the upper end of the door opening and opposed to the upper ends of the doors 140 is a lintel 148, Figures 1 and 3.

The motor board 143 is preferably formed as shown in Figure 4—i. e., is made up of a central section 149 and sections 150 grouped about and to which the section 149 is detachably connected, and each arranged with the grain of the wood extending in the direction of its length, this being advantageous in order to provide for strength and to permit the uniform expansion and contraction of the motor board. The preferable arrangement of the grain of the wood in the sections 145 of the bottom wall 142 is the same as that just described with reference to the motor board, and for the same reason. The section 149 of the motor board 143 is detachably connected by screws 149ª, in order to permit of ready access being gained to the motor (not shown) in the casing 149ᵇ that is suspended from the motor board. Fixed to the motor board 143 and connected by screws to the inner side of the body 5 are blocks 149ᶜ. The motor board 143 is connected by nails 151 to the motor board rim 35, as appears in Figure 3.

The closure of the cabinet is of novel and advantageous construction, and comprises a diametrical bar 152 arranged above and in spaced relation to the motor board rim 35, lids 153, hinged at 154 to the said bar 152, and arcuate flanges 155 that are fixed to and depend from the lids 153. At this point it is to be understood that the said flanges 155 and filler blocks 157, hereinafter referred to, are cut from the annular cut-off member 33 of the original cylinder, this being a highly important feature of my invention as will hereinafter appear. The bar 152 is supported by brackets 156 fixed to the inner side of the rim 35 and superimposed on the motor board 143; and it will also be observed by reference to Figure 3 that the filler blocks 157 are interposed between the bar 152 and the upper edge of the rim 35 so as to close the spaces between the ends of the flanges 155 when the lids are closed, as appears in Figure 1. I would also have it understood at this point that the filler blocks 157 are arranged in matched relation with the other sections of staves incorporated in the cabinet.

The diametrical or bridge-bar 152 is provided with a central aperture 158, and in said aperture is socketed the lower reduced end of a tubular post 159 that carries at its upper end an appropriate electric light fixture 160. By reference to Figure 3, it will be observed that an upright conduit 161 is provided in the back portion of the cabinet for the passage of the wires 162 that are in electrical connection with the lamp filament or filaments of the fixture 160.

Within the cabinet body 5 and guarding the openwork characteristic 40 is a section 163, preferably of thin textile material that is adapted to permit the emission of sound from the sound box 164 within the cabinet, while precluding the entry of dust and dirt. The said sound box 164 is connected with and suspended from the motor board 143, as appears in Figure 3.

The door opening normally closed by the doors 140, affords access to a record-holding rack 165, that is superimposed upon the bottom wall 142. The front corners of the said rack 165 are screwed or otherwise fastened to the wall of the body 5, but the rear corners are left loose and are separated by clearance spaces from said wall, so that the rack will not interfere in any measure with free expansion and contraction of the body and cabinet as a whole.

By comparison of Figures 1, 2, 10 and 12 of the drawings, the peculiar and advantageous legs of the cabinet will be fully understood when it is stated that each leg comprises a major portion 166, Figure 10. The said major portion 166 is adapted to be sand-papered and smoothed by machinery, and is advantageous for such reason. It is let into a kerf or notch 167 in the wall 142, and is connected to the wall of the body 5 by nails 175, Figure 12. The upper end of each leg portion 166 is arranged flush with the under side of the motor board 143, Figure 12, and immediately below the motor board 143 each leg portion 166 is provided with a concave seat 176 in which is secured, by glue or other suitable means, a cylindrical ornamental element 177, which, like the leg portion 166, is adapted to be smoothed by machinery, with a view to contributing to economy in the fabrication of the cabinet. Immediately above each leg portion 166, the motor board 143 is provided with a kerf 178, and secured in the said kerf and superimposed on the upper end of the leg portion 166, is an element 178', preferably ornamental, that is fixed to the motor board and the wall of the body by nails or other suitable means. As appears in Figures 4 to 7, I prefer to employ four legs on each cabinet, with a view to contributing to the solid placing of the cabinet, but I do not, of course, desire to be understood as confining myself to any specific number of legs.

By particular reference to Figure 25, a highly important characteristic of my invention will be fully appreciated when it is stated that by reason of the annular member or motor board rim 35 and the annular member 125 (from which the closure flanges 155 are subsequently cut) being cut from the same cylinder of assembled staves as the body 5, the grains of the sections of wood throughout the height of the cabinet may be nicely matched so as to conduce to the finished appearance of the cabinet. Again, by virtue of the doors 140 being cut from the cylinder of assembled staves, the same ideal of grain matching may be carried out for the sake of finished appearance in the complete cabinet.

Another important feature of the invention resides in the fact that my process is expeditious and economical, and is further advantageous inasmuch as small pieces of lumber—i. e., pieces that are narrow and short, may be utilized.

Another important feature of the invention resides in the characteristic that by virtue of the cylindrical shape of the cabinet body, it will in no degree be deteriorated by contraction or expansion, notwithstanding it is fabricated of solid lumber.

Still another highly important feature of the invention resides in the openwork characteristic 40 that obviates the necessity of providing the cabinet body with the highly objectionable loose or extraneous scroll usually employed at the front of phonograph cabinets.

While I show the cabinet as embodying four legs, it is to be understood that when desired the cabinet may be provided with three equi-distant legs with a view to assuring solid setting of the cabinet on a floor or other surface.

Experiment has demonstrated that the closure of the cabinet may be expeditiously, efficiently and economically produced in the following manner, viz: by providing a disk-like portion of wood and forming the same with a central aperture and with a circular groove in one side adjacent to its periphery, securing the tongue on the annular cut-off portion 125 in the groove of the disk-like portion, and then making two cross cuts through the unit as a whole at opposite sides of the central aperture. When the parts are assembled and cut as stated, it will be observed that the elevated diametrical bar with an aperture therein to seat the lower end of the lamp-post, will be produced with filler blocks arranged adjacent to its ends, and then by hinging the lid portions to the opposite edges of the said diametrical bar, the complete closure will be produced.

Having described my invention, what I claim and desire to secure by Letters-Patent, is:

1. The process of producing a wooden cabinet which includes the assembling of a plurality of staves into a cylinder, cutting an end portion from the cylinder transversely to the grain of the staves, and connecting said end portion with the remainder of the cylinder with the stave portions in matched relation whereby the longitudinal continuity of the grain is attained.

2. The process of producing a wooden cabinet which includes assembling a plurality of staves into a hollow body of curvilinear cross-section, cutting an end portion from said body transversely to the grain of the staves, and connecting said end portion with the remainder of the body with the stave portions in matched relation whereby the longitudinal continuity of grain is attained.

3. The process of producing a wooden cabinet which includes the assembling of a plurality of staves in a cylinder, cutting an end portion from the cylinder transversely to the grain of the staves, interposing a third structural element between the body of the cylinder and said end portion, and connecting all three elements together in such a matched relation that the longitudinal continuity of the grain of the staves is attained.

4. The process of producing a wooden cabinet which includes the assembling of a plurality of staves in a cylinder, cutting end portions from the cylinder transversely to the grain of the staves and connecting said end portions with the body of the cylinder in matched relation so that the longitudinal continuity of the grain of the staves is attained.

5. The process of producing a wooden phonograph cabinet which consists in assembling together a plurality of staves to form a substantially cylindrical body, and then cutting an open work characteristic in the assembled cylinder to provide for the emission of sound.

6. The process of producing a wooden phonograph cabinet which consists in assembling together a plurality of staves to form a substantially cylindrical body, and then providing the assembled cylinder with a plurality of longitudinal prolonged openings to form an open work charactertistic for the emission of sound.

7. The process of producing a wooden cabinet which includes assembling a plurality of staves into a cylinder, cutting an end portion from the cylinder for subsequent use in association with the remainder of the cylinder with the staves in matched relation, and cutting a door opening in and a door from the cylinder, the latter for subsequent use in association with the remainder of the cylinder with the staves in matched relation.

8. The process of producing a wooden cabinet which includes assembling a plurality of staves into a cylinder, cutting an end portion from the cylinder for subsequent use in association with the remainder of the cylinder with the staves in matched relation, whereby continuity of grain is attained, and cutting a door opening in and a door from the cylinder, the latter for subsequent use in association with the remainder of the cylinder with the staves in matched relation.

9. The process of producing a wooden cabinet which consists in assembling a plurality of staves into a cylinder, cutting an end portion from the cylinder for subsequent use in association with the remainder of the cylinder with the staves in matched relation, whereby continuity of grain is attained, and cutting a door opening in and doors from the cylinder, the latter for subsequent use in association with the remainder of the cylinder with the staves in matched relation, whereby continuity of grain is attained.

10. The process of producing a wooden cabinet which includes assembling a plurality of staves into a cylinder, cutting an end portion from the cylinder, cutting a door opening in and a door from the cylinder, connecting said end portion with the remainder of the cylinder with the staves in matched relation, and hinging the door to the remainder of the cylinder with the staves in matched relation.

11. The process of producing a wooden cabinet which includes assembling a plurality of staves into a cylinder, cutting an end portion from the cylinder, cutting a door opening in and doors from the cylinder, connecting said end portion with the remainder of the cylinder with the staves in matched relation, and hinging the doors to the cylinder in the said opening and with the staves in matched relation.

12. The process of producing a wooden cabinet which includes assembling a plurality of staves into a cylinder, cutting an end portion from the cylinder, cutting a plurality of openings in the cylinder to provide the same of itself with an openwork characteristic, and connecting said end portion with the remainder of the cylinder with the staves of the elements in matched relation whereby continuity of grain is attained.

13. The process of producing a wooden cabinet which includes assembling a plurality of staves into a cylinder, cutting an end portion from the cylinder, cutting a plurality of openings in the cylinder to provide the same of itself with an openwork characteristic, cutting a door opening in and a door from the cylinder, connecting said end portion with the remainder of the cylinder with the staves of the elements in matched relation whereby continuity of grain is attained, and hinging the door in the door opening and to the remainder of the cylinder with the staves in matched relation whereby continuity of grain is also attained.

14. The process of producing a wooden cabinet which includes assembling a plurality of staves into a cylinder, cutting end portions from the cylinder, cutting arcuate portions from one of the said end portions, and connecting the remaining end portion and said arcuate portions with the remainder of the cylinder, with the staves of all of said elements in matched relation.

15. The process of producing a wooden cabinet which includes assembling a plurality of staves into a cylinder, cutting end portions from the cylinder, cutting arcuate portions from one of the said end portions, connecting the remaining end portion with the remainder of the cylinder, with the staves in matched relation, providing lid members and connecting the arcuate portions with the lids to equip the latter with flanges, and arranging the staves of said arcuate portions in matched relation to the staves of the remainder of the cylinder, and hinging the said lids in elevated position with the remainder of the cylinder.

16. The process of producing a cabinet which includes assembling a plurality of staves into a cylinder, cutting an end portion from the cylinder, superimposing a board on the end of the remainder of the cylinder, superimposing said end portion upon the board with its staves in matched relation to the staves of the remainder of the cylinder whereby continuity of grain is attained, and connecting said elements together.

17. The process of producing a wooden cabinet which includes assembling a plurality of staves into a cylinder, cutting end portions from the cylinder, superimposing a board on one end of the remainder of the cylinder, superimposing one of the end portions on the said board with its staves in matched relation, and superimposing a closure upon said board; said closure including arcuate portions and filler blocks cut from the other end portion, a support and lids hinged to said support, and the staves of said closure portions being in matched relation to the other staves.

18. The process of producing a wooden cabinet which includes assembling a plurality of staves into a cylinder, cutting annular end portions from the cylinder, rotating the remainder of the cylinder and the annular end portions against an abrasive factor to exteriorly smooth the same, connecting one of the annular end portions with the remainder of the cylinder with the staves in matched relation, cutting arcuate portions from the other end portions to form lid flanges, and arranging the staves of said arcuate portions in matched relation.

19. The process of producing a wooden cabinet which includes assembling a plurality of staves into a cylinder, cutting an annular end portion from the cylinder, rotating said end portion and the remainder of the cylinder against an abrasive factor, and cutting a door opening in and a door from the cylinder; the door being smoothed at its outer side by the said rotary action.

20. The process of producing a wooden cabinet which includes assembling a plurality of staves into a cylinder, cutting a plurality of openings in the wall of the cylinder to provide the same of itself with an open-work characteristic, and rotating the cylinder against an abrasive factor to exteriorly smooth the same.

21. The process of producing a wooden cabinet which includes assembling a plurality of staves into a cylinder, cutting annular end portions from the cylinder for subsequent use in association with the remainder of the cylinder with the staves in matched relation, cutting a plurality of openings in the remainder of the cylinder to provide the same of itself with an openwork characteristic, and rotating the remainder of the cylinder and said end portions against an abrasive factor.

22. The process of producing a wooden cabinet which includes assembling a plurality of staves into a cylinder, cutting annular end portions from the cylinder for subsequent use in association with the remainder of the cylinder with the staves in matched relation, cutting a plurality of openings in the remainder of the cylinder to provide the same of itself with an openwork characteristic, rotating the remainder of the cylinder and said end portions against an abrasive factor, and cutting a door opening in and a door from the remainder of the cylinder, the door for subsequent use in the opening and hinged to the remainder of the casing with its staves in matched relation.

23. The process of producing a wooden cabinet which includes assembling a plurality of staves into a cylinder, cutting annular end portions from the cylinder, forming a plurality of openings in the cylinder to provide it of itself with an openwork characteristic, rotating the cylinder and said annular end portions against an abrasive factor to exteriorly smooth the same, cutting a door opening in and a door from the cylinder, hinging the said door to the cylinder with its staves in matched relation, superimposing a board on the cylinder, superimposing one of the annular end portions on said board with its staves in matched relation, superimposing diametrically opposite supports on the board, superimposing a diametrical bar on said supports, hinging lids to the bar, cutting arcuate portions and filler blocks from the other annular end portion, and joining the said arcuate portions to the lids and arranging the same with their staves in matched relation, and interposing the said filler blocks between the annular end portion and the diametrical bar and arranging said filler blocks in matched relation.

24. In a cabinet, the combination of a cylindrical body, a motor board superimposed upon and connected with the body, an annular member superimposed upon the motor board and secured in position, a crossbar supported above and in spaced relation to the annular member, lids hinged to said cross-bar and having arcuate side walls arranged when the lids are closed to rest on said annular member, and filler sections interposed between the annular member and the cross-bar and adapted to close the spaces between the ends of said arcuate walls when the lids are closed.

25. In a cabinet, the combination of a cylindrical body, a motor board superimposed upon and connected with the body, an annular member superimposed upon the motor board and secured in position, a crossbar supported above and in spaced relation to the annular member, lids hinged to said cross-bar and having arcuate side walls arranged when the lids are closed to rest on said annular member, and filler sections interposed between the annular member and the cross-bar and adapted to close the space between the ends of said arcuate walls when the lids are closed; the body, the annular member, the arcuate walls of the lids and the filler blocks being formed of assembled staves of wood.

26. In a cabinet, the combination of a cylindrical body, a bottom wall and a motor board opposed to and connected with opposite ends of the body and extending beyond the exterior surface of the body and having vertically-alined notches, leg portions disposed in the notches of the bottom wall and fastened to the body and having their upper ends flush with the underside of the motor body, an annular member superimposed on the motor board and secured in position, blocks fastened to said annular member and motor board and disposed in the notches of the motor board and superimposed on said leg portions, and ornamental members secured to the leg portions and disposed below the motor board.

27. The process of producing a wooden cabinet which includes assembling a plurality of staves into a hollow body, cutting an end portion from the body, opposing a motor board to one end of the remainder of the body, opposing the cut-off end portion to the motor board, and fixing the elements together.

28. The process of producing a wooden cabinet which includes assembling a plurality of staves into a hollow body, cutting end portions from the body, opposing a motor board to one end of the remainder of the body, opposing one cut-off end portion to the motor board, fixing the body, motor board and end portion together, and utilizing the cut-off end portion in closure means.

29. The process of producing a wooden cabinet which includes assembling a plurality of staves into a hollow body, cutting annular end portions from said body, opposing a motor board to one end of the body, opposing one of the cut-off end portions to the motor board, joining the other cut-off end portion to a wooden portion, cutting the said wooden portion and the end portion across at opposite sides of the center of the portion to simultaneously produce a supporting bar, flanged lids and filler blocks, hinging said lids to said bar, and supporting the bar on the motor board, and associating the same with the remainder of the cabinet.

In testimony whereof I affix my signature.

WILLIAM H. FRIEDLINE.